(12) United States Patent  (10) Patent No.: US 11,112,816 B2
Bass et al.  (45) Date of Patent: Sep. 7, 2021

(54) MINIATURIZED DIGITAL TEMPERATURE SENSOR

(71) Applicant: Birad—Research & Development Company Ltd., Ramat Gan (IL)

(72) Inventors: Ori Bass, Tel Aviv (IL); Joseph Shor, Tel Mond (IL)

(73) Assignee: Birad—Research & Development Company Ltd., Ramat Gan (IL)

( * ) Notice: Subject to any disclaimer, the term of this patent is extended or adjusted under 35 U.S.C. 154(b) by 452 days.

(21) Appl. No.: 15/959,239

(22) Filed: Apr. 22, 2018

(65) Prior Publication Data

US 2019/0324490 A1  Oct. 24, 2019

(51) Int. Cl.
*G05F 3/30*  (2006.01)
*G01K 7/01*  (2006.01)

(52) U.S. Cl.
CPC .............. *G05F 3/30* (2013.01); *G01K 7/015* (2013.01)

(58) Field of Classification Search
CPC . G01K 7/015; G01K 7/00; G01K 7/01; G05F 3/30
See application file for complete search history.

(56) References Cited

U.S. PATENT DOCUMENTS

| 6,078,208 | A * | 6/2000 | Nolan | G01K 7/01 327/512 |
|---|---|---|---|---|
| 7,780,346 | B2 * | 8/2010 | Chellappa | G01K 7/01 374/178 |
| 8,228,052 | B2 * | 7/2012 | Marinca | G05F 3/30 323/313 |
| 8,482,342 | B2 * | 7/2013 | Conte | H03F 3/347 327/539 |
| 9,122,290 | B2 * | 9/2015 | Eberlein | G05F 3/16 327/539 |
| 9,323,275 | B2 * | 4/2016 | Marinca | G05F 3/30 |
| 9,748,969 | B1 * | 8/2017 | Bach | H03M 3/382 |
| 2005/0231270 | A1 * | 10/2005 | Washburn | G05F 3/30 327/539 |
| 2009/0108918 | A1 * | 4/2009 | Chellappa | G05F 3/30 327/539 |
| 2009/0110027 | A1 * | 4/2009 | Chellappa | G01K 7/01 374/178 |
| 2010/0244808 | A1 * | 9/2010 | Marinca | G05F 3/30 323/315 |
| 2011/0121809 | A1 * | 5/2011 | Camacho Galeano | G05F 3/262 323/313 |
| 2013/0038317 | A1 * | 2/2013 | Marinca | G05F 3/265 323/313 |

(Continued)

*Primary Examiner* — Nathaniel T Woodward
*Assistant Examiner* — Philip L Cotey
(74) *Attorney, Agent, or Firm* — Dekel Patent Ltd.; David Klein (57) ABSTRACT

A sensor circuit includes a bandgap reference circuit (BGREF) that produces two outputs, a temperature dependent output and a reference voltage, which does not change with temperature. The temperature dependent output includes a PTAT (proportional to absolute temperature, rising with increased temperature) portion and a CTAT (complementary to absolute temperature, falling with increased temperature) portion. Circuitry is provided that calculates the reference voltage by adding the PTAT portion and a divided version of the CTAT portion in which the CTAT portion has been divided by a divisor.

7 Claims, 5 Drawing Sheets

(56) References Cited

U.S. PATENT DOCUMENTS

2014/0266139 A1* 9/2014 Eberlein .................. G05F 3/16
 323/313
2015/0234414 A1* 8/2015 Marinca ................. G05F 3/262
 323/313
2018/0017986 A1* 1/2018 Lahiri ....................... G05F 3/30

* cited by examiner

MINIATURIZED DIGITAL TEMPERATURE SENSOR

FIELD OF THE INVENTION

The present invention relates generally to temperature sensors in integrated circuits, and particularly a miniaturized digital temperature sensor which employs a bandgap reference circuit (BGREF) that produces two outputs, a temperature dependent output and a reference voltage.

BACKGROUND OF THE INVENTION

A plurality of temperature sensors may be integrated on a chip and used to monitor temperature at various locations on the chip. There can be as many as 50 sensors on a product, so it is critical that they be small and power efficient.

Temperature readings from the sensors may be fed to a temperature management device that manages circuits (e.g., central processing unit (CPU)) on the chip based on the temperature readings. For example, the temperature management device may manage the circuits based on the temperature readings to prevent the temperature at one or more locations on the chip from becoming too high, which can potentially damage the chip. In this example, if a temperature reading rises above a temperature threshold, then the temperature management device may take steps to reduce the temperature (e.g., reduce a frequency of a circuit). Thermal sensors may also be used to determine the appropriate Vcc level and may be used for fan regulation, among other applications.

Figure 1A:
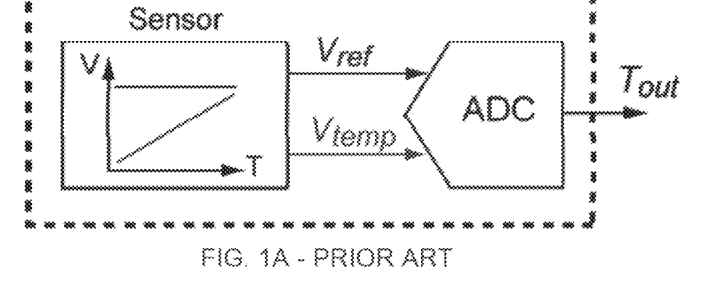
FIG. 1A is a block diagram of a prior art thermal sensor.

FIG. 1A shows a block diagram of a prior art thermal sensor. In general there is a sensing circuit, usually a bandgap reference circuit (BGREF) which produces two outputs, a temperature dependent output and a reference voltage, which does not change with temperature. The temperature dependent output can be PTAT (proportional to absolute temperature, or rising with increased temperature) or CTAT (complementary to absolute temperature, or falling with increased temperature).

Figure 1B:
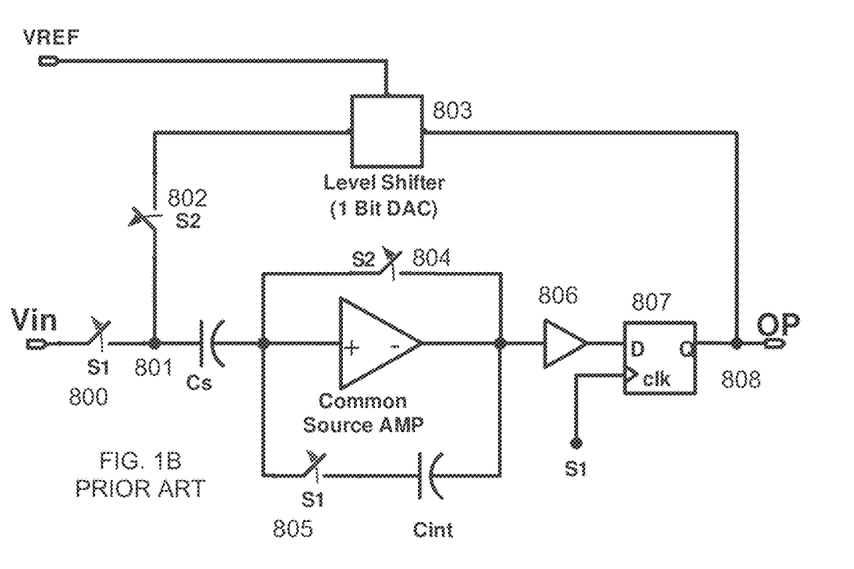
FIG. 1B is a schematic of a prior art one-bit sigma-delta modulator, which is an analog-to-digital converter (ADC)

In order to produce a digital temperature reading (DTR), a ratiometric measurement is carried out by comparing the temperature-dependent voltage (in FIG. 1A, Vtemp) to a reference voltage (Vref). The comparison of these voltages is converted to a digital temperature reading using an analog-to-digital converter (ADC). In the prior art, one of the possibilities of an ADC is a sigma delta (SD) modulator as shown in FIG. 1B.

Briefly, Vin is input via a switch 800 to a node 801, and then via a capacitor Cs to an input of a common source amplifier. A level shifter 803 is coupled to node 801 via a switch 802. The level shifter 803 receives Vref input. A switch 804 is connected across the input and output of the common source amplifier. A switch 805 and a capacitor Cint are connected across the input and output of the common source amplifier. The common source amplifier outputs to another amplifier 806 which is coupled to a flip flop (FF) 807. The flip flop 807 outputs the output OP, which is fed back to the level shifter 803 via a node 808. Two non-overlapping clocks, S1 and S2 are utilized. The switches 800 and 805 are enabled on the clock cycle S1 and the following switches 802 and 804 are enabled in clock cycle S2.

The SD modulator generates a bitstream. The two capacitors, Cint and Cs and the amplifier (Common Source Amp) along with the two switches 804 and 805 comprise an integrator. As mentioned, there are two non-overlapping opposite phased clocks, s1 and s2, which are input to the switches 804 and 805 as shown. The output OP is fed back to the input via the level shifter 803 (1 bit DAC). In this manner, the N−1 bit is compare to the Nth bit. By doing so, the SD generates a bitstream OP after K number of clocks, such that:

$$DTR = \frac{OP}{K} = \frac{Vin}{Vref} \tag{0a}$$

This prior art SD outputs a bitstream whose ratio of logic "1" to the number of clocks is representative of the Vin/Vref signal.

The transfer function (TF) of the integrator in each cycle is determined by the capacitor ratio, such that $$TF = \frac{C_s}{C_{int}} \tag{0b}$$

Figure 1C:
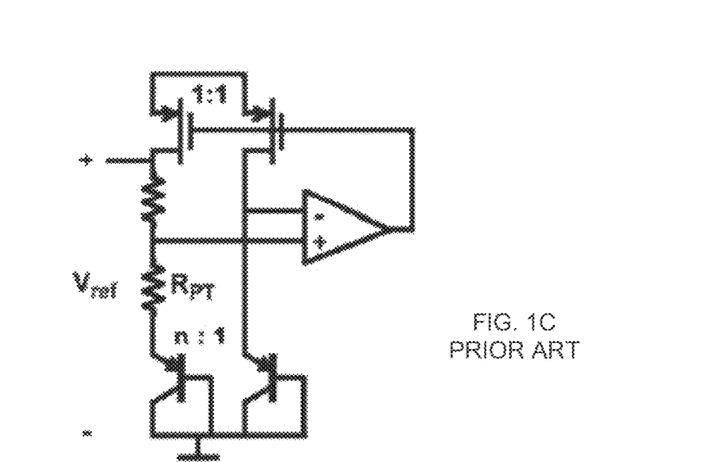
FIG. 1C is a schematic of a typical BGREF circuit used in the prior-art for temperature sensing.

Reference is now made to FIG. 1C, which shows a typical BGREF circuit used in the prior-art. The circuit utilizes Bipolar Junction Transistors (BJT) or diodes as sensing elements. The equation for current in a BJT (or diode) is:

$$I_C = I_S \exp\left(\frac{qV_{be}}{KT}\right) \text{ and } V_{BE} = V_{g00} - \lambda T \tag{1}$$

where Ic is the collector current, Vbe is the base-emitter voltage, K=Boltzmann's constant, T=temperature, q=electron charge, Vg00 is the extrapolated Vbe at 0 K and λ is its linear temperature coefficient. Using equation 1, the CTAT and PTAT terms of the BGREF can be calculated for the circuit in FIG. 1C to be:

$$V_{ref} = V_{be} + \frac{R_1}{R_2} * \frac{KT}{q} \ln(n) \tag{2}$$

Accordingly, the bandgap reference can be used as the reference voltage Vref of an ADC designed to digitize dVbe. In the prior art, the reference voltage Vref is generated by adding an amplified version of dVbe to Vbe.

As can be seen in equation 2, the BGREF creates both a PTAT term and a CTAT term (Vbe). The problem with BGREF circuits is that they tend to be very large in advanced CMOS process nodes, since the parasitic BJT's used are very large circuit elements and many of these elements are required in the sensor. The sensor also requires a high precision analog to digital converter (ADC), which requires significant area and power.

Currently, there are two dominant mechanisms for temperature sensing due to their proven technology and high reliability: Vbe sensing (which corresponds to CTAT), and dVbe (or delta-Vbe) sensing (which corresponds to PTAT). The Vbe signal is usually ~2 mV/° C., which is a larger signal than the dVbe signal, which is typically 100-200 μV/° C. This makes Vbe sensing easier to design and smaller, since it requires a less precise ADC. However, the Vbe signal has some curvature to it while the dVbe signal is completely linear. This means the dVbe sensors can be more accurate if there is a high precision ADC present. In general, the BJT based sensors, both Vbe and dVbe, are more desirable than other mechanisms, since the physics involved is very predictable and less process dependent in the CMOS process than sensors based on threshold voltage or thermistors. Thus BJT sensing is currently the most accepted type in the industry for on-die sensing.

In the prior art, the BGREF circuit and the ADC are two separate blocks. The output of the BGREF is input to the ADC, but each of them has independent functionality. In the case of the Sigma Delta (SD) ADC, the SD has its own separate amplifier and capacitors for forming the ratio of the input signal (Vbe or dVbe) to the reference voltage.

SUMMARY OF THE INVENTION

The present invention seeks to provide a miniaturized digital temperature sensor, as is described more in detail hereinbelow. In one aspect, contrary to the prior art, the BGREF and ADC functions are combined into a single block. As mentioned in the background, in the prior art, the ADC calculates the reference voltage Vref by adding an amplified version of dVbe (the PTAT term) to Vbe (the CTAT term). In contrast with the prior art, in the present invention, the ADC calculates the reference voltage Vref by adding dVbe (the PTAT term) to a divided version of Vbe (the CTAT term).

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

In general, throughout the specification and claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "circuitry" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on." For purposes of the embodiments, the transistors are metal oxide semiconductor (MOS) transistors, which include drain, source, gate, and bulk terminals, but the transistors may include any device implementing transistor functionality, such as without limitation, bi-polar junction transistors—BJT PNP/NPN, BiCMOS, CMOS, eFET, etc. Note that the inverter elements shown in the schematics have an input and an output which are shown explicitly in the schematic, but there is also implied a positive supply terminal (Vcc) and a negative supply terminal (Vss) of the inverters. When the negative and positive supply terminals are not connected to anything, it is implied that the negative supply terminal is connected to Vss, the negative supply, while the positive supply terminal is connected to Vcc, the positive supply, as is known in the art. Some of the schematics show connections of the implied negative and positive supply terminals to different supplies.

In the prior art thermal sensors the BGREF function, to generate Vbe and dVbe, and the ADC function are generated by two separate blocks. In contrast, in the present invention, the area of the sensor is reduced without sacrificing functionality by combining these two blocks into a single block.

As mentioned in the background, in the prior art, the ADC calculates the reference voltage, Vref and the temperature signal, DTR, by adding an amplified version of dVbe (aka ΔVbe, the PTAT term) to Vbe (the CTAT term) as in equation 3:

$$DTR = \frac{\alpha * \Delta vbe}{Vref} = \frac{\alpha * \Delta vbe}{\alpha * \Delta vbe + vbe} \quad [3]$$

In contrast with the prior art, in the present invention, instead of amplifying dVbe (the PTAT term), Vbe (the CTAT term) is divided as in equation 4:

$$DTR = \frac{\Delta vbe}{\Delta vbe + vbe\frac{\beta}{\alpha}} \quad [4]$$

The terms α and β will now be explained with reference to FIG. 2A, which illustrates a simplified block diagram of a temperature sensor readout circuit, in accordance with a non-limiting embodiment of the present invention. The temperature sensor may incorporate the BGREF and ADC as a charge sharing topology. The dividing process may be achieved through the modified charge sharing topology with an alternate integration stage.

Figure 2A:
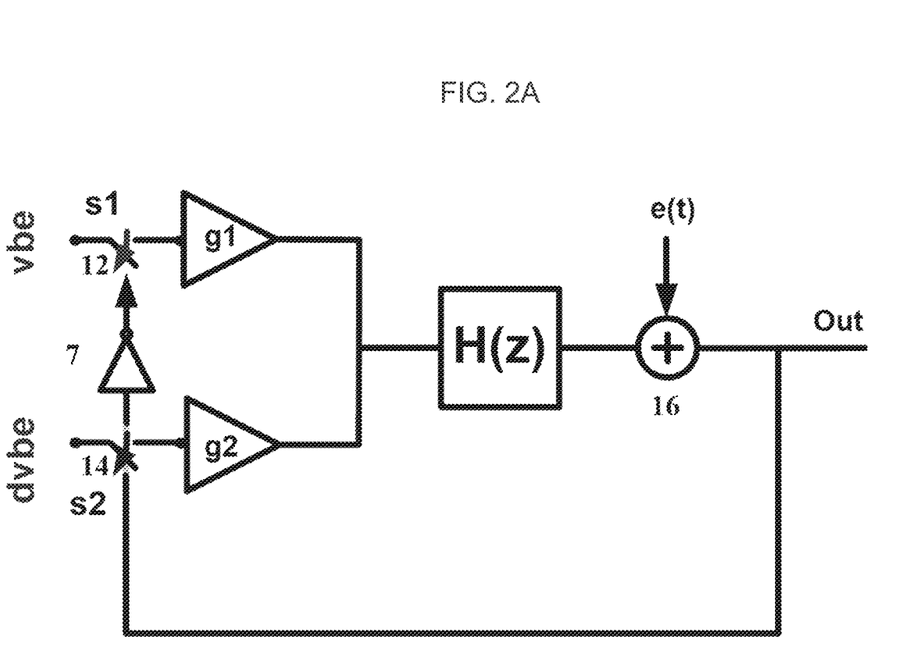
FIG. 2A is a simplified circuit diagram of a temperature sensor circuit for measuring temperature in which the CTAT voltage (base-emitter voltage Vbe) is divided by a divisor, in accordance with a non-limiting embodiment of the present invention.

In the diagram of FIG. 2A, there are two non-overlapping opposite phased clocks, s1 and s2, which are input to the switches 12 and 14. Switch 14 is coupled to an inverter 7 whose output is coupled to switch 12. The dVbe input is coupled via switch 14 to an integrator g2 (whose multiplication factor or gain corresponds to a in equation 4), and the Vbe input is coupled via switch 12 to an integrator g1 (whose multiplication factor or gain corresponds to β in equation 4). The outputs of integrators g1 and g2 are input into an ideal integrator transfer function unit H(z), which after being coupled to a quantization noise circuit element 16 that receives a time-dependent input of e(t), provides the temperature sensor output Out, which is equivalent to DTR. Note that the transfer functions g1 and g2 are determined by the feedback loop, and are thus considered programmable transfer functions. The input e(t) is a high frequency noise error which is unwanted, but generally exists in any such system. This error is removed by transferring the output into a digital filter, which filters the high frequency error. One example of such a filter would be a digital counter. Thus, when the Out signal of FIG. 2A is counted, a filtering operation is also simultaneously taking place.

Figure 2B:
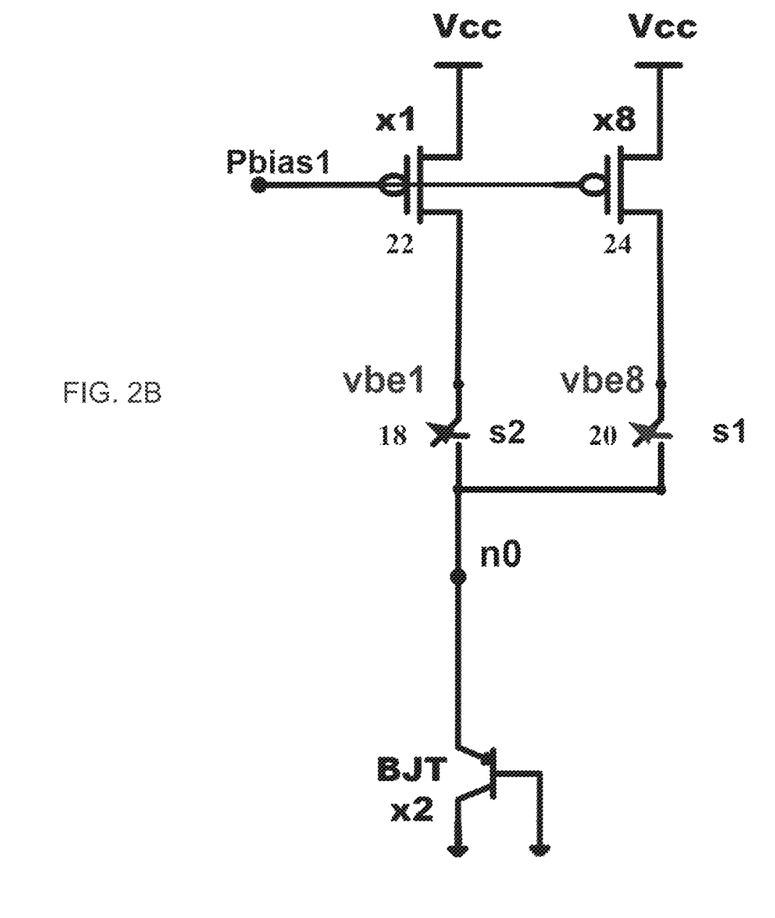
FIG. 2B is a simplified circuit diagram of circuitry used to generate the Vbe and dVbe voltages, in accordance with a non-limiting embodiment of the present invention.

Reference is now made to FIG. 2B. In the circuit, a BJT has its collector coupled to ground, its base coupled to ground and its emitter coupled via a node n0 to a switch 18 (with a clock phase s2) and to a switch 20 (with a clock phase s1). Switch 18 is coupled to a drain of a PMOS transistor 22 (which is the branch of unity multiplication (×1)). A gate of PMOS transistor 22 is coupled to an input Pbias1 and a source of 22 is coupled to Vcc. The gate of PMOS transistor 22 is coupled to a gate of a PMOS transistor 24 (which is the branch of n multiplication, which in this non-limiting example is 8 (×8)). Switch 20 is coupled to a drain of the PMOS transistor 24. A source of transistor 24 is coupled to Vcc. The bulks of transistors 22 and 24 are both coupled to Vcc by inference.

The single BJT serves as a parasitic diode, and the two PMOS transistors 22 and 24 serve as two current sources which alternate as needed or instructed from the charge sharing circuit shown in FIG. 3 (described below). When switch 18 is conducting, a Vbe1 voltage is produced; when switch 20 is conducting, a Vbe8 voltage is produced.

When multiple temperature sensors are needed, a distributed sensing topology may be used. This means that instead of using a full temperature sensor, only the sensing element is duplicated and distributed across the integrated circuit. Due to this very small sensing element, a considerable amount of space can be saved when using this sensor in the distributed topology, in addition to the initial area savings the sensor provides.

Accordingly, in the circuitry of the present invention, the Vbe1 and Vben voltages (FIG. 2B) are used to generate the Vbe and dVbe voltages shown in FIG. 2A. Vben can be produced when a higher current passes through the diode which is n times higher than the current used to create the Vbe voltage; in the illustrated embodiment n=8 and the description follows for this value, but n is not limited to this value. As stated before, s1 and s2 are non-overlapping phases. The Vbe value shown in eq'n 4 can be derived from Vbe8 in FIG. 2B which is coupled to node N0 in phase s1. The dVbe voltage can be expressed by the following equation:

$$dVbe = Vbe8 - Vbe1 \quad [5]$$

The subtraction shown in eq'n [5] can be accomplished by charge sharing techniques, as will be shown below.

Using equation 4 in the circuit, results in dividing Vbe instead of multiplying dVbe. This has an advantage over the prior art, since the division function may be carried out with capacitors and an amplifier for the multiplication is not required. In addition, since Vbe is divided, its non-linearity has a smaller effect on the output. Choosing the correct integration gain (or stage) is solely dependent on which voltages, Vbe or Vbe8, are input. The invention advantageously reduces the total number of capacitors needed for temperature measurement. Moreover, the two voltages Vbe and Vbe8 are created from a single BJT. This saves area because BJT's are typically very large devices in the CMOS process.

Figure 3:
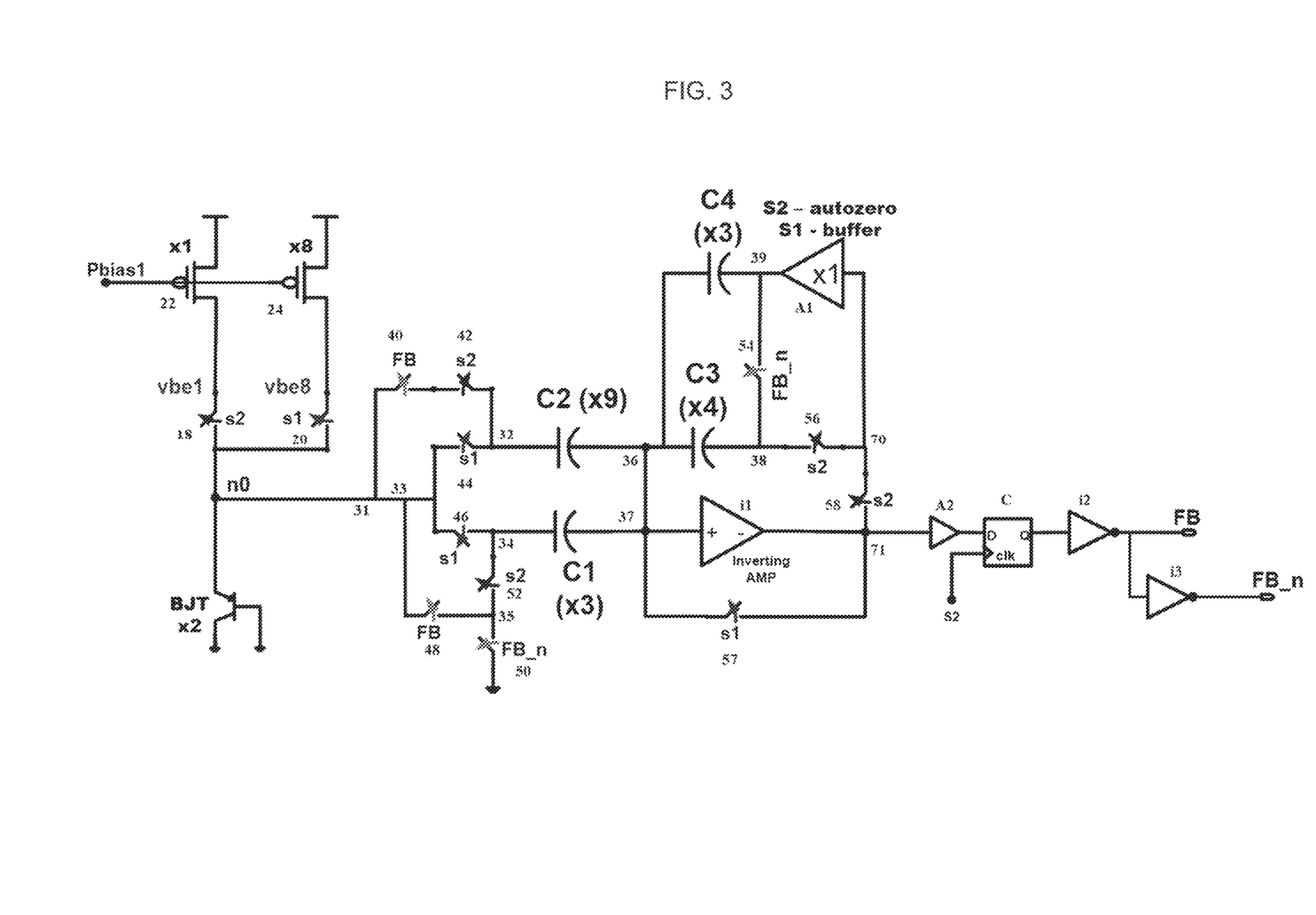
FIG. 3 is a simplified circuit diagram of temperature sensor circuitry in accordance with a non-limiting embodiment of the present invention.

Reference is now made to FIG. 3, which illustrates a simplified circuit diagram of the temperature sensor circuitry, in accordance with a non-limiting embodiment of the present invention.

The node n0 of the circuitry of FIG. 2B is coupled to a node 31 and from there to a switch 40 (with a clock phase FB) which is coupled to a switch 42 (with a clock phase s2), which in turn is coupled to a node 32. Node 31 is coupled via a node 33 to two switched capacitor branches. In one branch, node 33 is coupled to a switch 44 (with a clock phase s1), which in turn is coupled via node 32 to a capacitor C2 (which may be associated with a multiplication of 9, for example). In the other branch, node 33 is coupled to a switch 46 (with a clock phase s1), which in turn is coupled via a node 34 to a capacitor C1 (which may be associated with a multiplication of 3, for example). Node 33 is also coupled to a switch 48 (with a clock phase FB) which is coupled via a node 35 to a switch 50 (with a clock phase FB_n). A switch 52 (with a clock phase s2) is coupled to nodes 34 and 35.

Capacitor C2 is coupled to node 36. Capacitor C1 is coupled to node 37. A capacitor C3 is coupled between nodes 36 and 38. A switch 54 (with a clock phase FB_n) is coupled between nodes 38 and 39. A capacitor C4 is coupled between nodes 36 and 39. An amplifier A1 is coupled between nodes 70 at the input of A1 and node 39 at the output of A1. A switch 56 (with a clock phase s2) is coupled between nodes 38 and 70. An inverting amplifier i1 is coupled between nodes 37 and 71. A switch 57 (with a clock phase s1) is coupled between nodes 37 and 71. A switch 58 (with a clock phase s2) is coupled between nodes 70 and 71. An amplifier A2 is coupled to node 71 and outputs to a Flip-Flop C, which is coupled to an inverter i2 which is coupled to clock phase FB and via another inverter i3 to clock phase FB_n. The Flip-flop C receives S2 at its clock input and the output of A2 at its data input.

Accordingly, the charge sharing scheme shown in FIG. 3 operates with two phases, s1 and s2 which are non-overlapping phases. Each switch in FIG. 3 is coupled to either s1 or s2 as shown, or is coupled to the output signals FB and FB_n, which is the inverse of FB. The amplifier A1 is a unity gain buffer. In the s1 phase (i.e. when s1 is conducting), the Inverting Amp i1 has its output (node 71) connected to its input (node 37) such that it is biased at its trip point. This is referred to as autozero (AZ). In the s1 phase, the Vbe8 voltage is sampled on capacitors C1 and C2 via nodes 34 and 32. In addition, any previous voltage which was computed from the integrator (capacitor C1 or C2 to capacitor C3) via node 71, is copied to capacitor C4 by the buffer of amplifier A1.

In the s2 phase, the charge sharing scheme decides to sample a Vbe voltage (i.e. Vbe8) or a dVbe voltage (Vbe8-Vbe1). If a Vbe voltage needs to be sampled, the FB output signal equals logic 0. This results in capacitor C1 sampling the zero voltage, via node 34 and capacitor C2 is kept floating. The capacitors C3 and C4 are placed in parallel. This produces me $$g1 = \beta = \frac{C1}{(C3 + C4)}$$

or integrator 1 transfer function.

Alternatively, in s2, if the FB output signal goes to a logic 1, then a Vbe1 voltage is sampled at nodes 34 and 32. This results in a dVbe voltage across C1 and C2. C4 is left floating, and a different transfer function is produced, $$g2 = \alpha = \frac{C1 + C2}{C3}.$$

Thus based on the feedback signal, the transfer function can be g1 or g2, and is thus considered a programmable transfer function.

When the two phases of the process are completed, the final output of the charge sharing scheme gives the digital output of equation 6, which is proportional to temperature:

$$\frac{\text{Output} - \text{at node } FB}{K} = \frac{\alpha * \Delta vbe}{\alpha * \Delta vbe + \beta vbe} = \frac{\Delta vbe}{\Delta vbe + \frac{\beta}{\alpha} vbe} \propto f(T) \quad [6]$$

The digital bitstream at node FB is the output. This is input into a counter. After K clocks (not limited to 1024), the number in the counter will be proportional to the value in eq'n 6. In this manner the readout circuit acts a divisor of Vbe to produce the digital signal. The overall circuit is a Sigma Delta modulator which toggles between the two transfer function states. This differentiates it from the prior art SD which toggles between logic ones and zeros based on a single transfer function.

Figure 4:
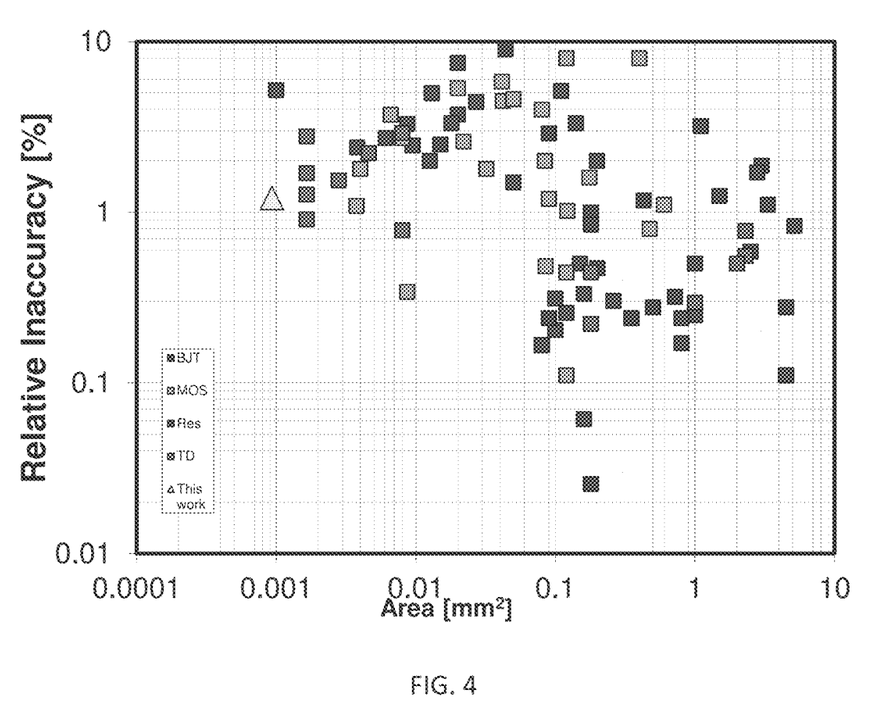
FIG. 4 is a graphical illustration of the relative inaccuracy of the temperature sensor of the present invention compared with the prior art.

The current smallest area of this sensor analog part is 28.2 um×33 um=930 um^2 which is the current state of the art for area shown in FIG. 4. The prior art is taken from K. A. A. Makinwa, "Temperature Sensor Performance Survey," [Online]. Available: http://ei.ewi.tudelft.nl/docs/TSensor_survey.xls. The paper that provides the rationale for this survey is K. A. A. Makinwa, "Smart Temperature Sensors in Standard CMOS", (Proc. Eurosensors) Procedia Engineering, pp. 930-939, September 2010.

Quoting from "Smart Temperature Sensors in Standard CMOS": "Given the variety of smart temperature sensors that can be realized in standard CMOS, it would be useful to devise a single figure of merit (FOM) to express their performance. Since a smart temperature sensor may be regarded as temperature-to-digital converter, an ADC FOM, involving energy per conversion and resolution could be defined."

The sensor of the present invention is superior to the prior art both in accuracy and size.

The invention claimed is:

1. A temperature sensor circuit comprising:
   two temperature dependent voltages, one of which is a PTAT voltage, which is proportional to absolute temperature, rising with increased temperature, and another of which is a CTAT voltage, which is complementary to absolute temperature, falling with increased temperature; and
   circuitry that calculates the temperature by adding said PTAT voltage and a divided version of said CTAT voltage in which said CTAT voltage has been divided by a divisor, wherein said CTAT voltage comprises Vbe (base-emitter voltage) and said PTAT voltage comprises dVbe, and the Vbe and dVbe voltages are generated by a single bipolar junction transistor (BJT).

2. The sensor circuit according to claim 1, wherein said circuitry that calculates said temperature by adding said PTAT voltage and the divided version of said CTAT voltage in which said CTAT voltage has been divided by a divisor is defined by an equation:

$$DTR = \frac{\Delta vbe}{\Delta vbe + vbe \frac{\beta}{\alpha}}$$

wherein DTR is a digital temperature reading of said temperature, Δvbe is the dVbe voltage, vbe is the Vbe voltage, and α and β are coefficients of two different states of a programmable integrator transfer function unit that comprises a feedback signal that determines which of said two different states are used by said programmable integrator transfer function unit.

3. The sensor according to claim 2, wherein the Vbe voltage is coupled via a first switch to a first integrator (g1) whose multiplication factor or gain is β and the Δvbe voltage is coupled via a second switch to a second integrator (g2) whose multiplication factor or gain is a.

4. The sensor circuit according to claim 3, wherein said BJT has a collector coupled to ground, a base coupled to ground and an emitter coupled via a node (n0) to a first switch, with a clock phase (s2), and to a second switch, with a clock phase (s1), said first switch being coupled to a drain of a first PMOS transistor, which is a branch of unity multiplication, a gate of said first PMOS transistor being coupled to an input (Pbias1) and a source of said first PMOS transistor being coupled to Vcc, a gate of said first PMOS transistor being coupled to a gate of a second PMOS transistor, which is a branch of n multiplication, said second switch being coupled to a drain of said second PMOS transistor, a source of said second PMOS transistor being coupled to Vcc, bulks of said first and second transistors both being coupled to Vcc; and
   wherein said BJT serves as a parasitic diode, and said first and second PMOS transistors serve as two current sources which alternate as needed or instructed from a charge sharing circuit such that when said first switch is conducting, a Vbe1 voltage is produced and when said second switch is conducting a Vben voltage is produced, wherein the Vbe1 and Vben voltages are used to generate the Vbe and dVbe voltages.

5. The sensor circuit according to claim 4, wherein said node (n0) is coupled to a node (31) and from there to a third switch with a clock phase (FB) which is coupled to a fourth switch with a clock phase (s2), which in turn is coupled to a node (32), and wherein said node (31) is coupled via a node (33) to two switched capacitor branches, wherein in one of said branches, said node (33) is coupled to a fifth switch with a clock phase (s1), which in turn is coupled via said node (32) to a capacitor (C2), and in the other of said branches, said node (33) is coupled to a sixth switch with a clock phase (s1), which in turn is coupled via a node (34) to a capacitor (C1), said node (33) being coupled to a seventh switch with a clock phase (FB) which is coupled via a node (35) to an eighth switch with a clock phase (FB_n), and a ninth switch with a clock phase (s2) is coupled to said nodes (34) and (35), and said capacitor (C2) is coupled to a node (36) and said capacitor (C1) is coupled to a node (37), a capacitor (C3) is coupled between said node (36) and a node (38), and a tenth switch with a clock phase (FB_n) is coupled between said node (38) and a node (39), and a capacitor (C4) is coupled between said nodes (36) and (39), and an amplifier (A1) is coupled between a node (70) at an input of said amplifier (A1) and said node (39) at an output of said amplifier (A1), an eleventh switch with a clock phase (s2) is coupled between said nodes (38) and (70), an inverting amplifier (i1) is coupled between said node (37) and a node (71), and a twelfth switch with a clock phase (s1) is coupled between said nodes (37) and (71), and a thirteenth switch with a clock phase (s2) is coupled between said nodes (70) and (71), and an amplifier (A2) is coupled to said node (71) and outputs to a Flip-Flop (C), which is coupled to an inverter (i2) which is coupled to the clock phase (FB) and via another inverter (i3) to the clock phase (FB_n), wherein said Flip-flop (C) receives (S2) at its clock input and the output of amplifier (A2) at its data input.

6. The sensor according to claim 3, wherein a first capacitor (C1) and a second capacitor (C2) transfer the Vbe and dVbe into said programmable integrator transfer function unit, and a third capacitor (C3) and a fourth capacitor (C4) determine a multiplication factor of said programmable integrator transfer function unit, and said first integrator $$g1 = \beta = \frac{C1}{(C3+C4)}$$

and said second integrator $$g2 = \alpha = \frac{C1+C2}{C3}.$$

7. The sensor circuit according to claim 1, wherein circuitry that divides said CTAT voltage by the divisor comprises capacitors and said divisor is a function of capacitances of said capacitors.

* * * * *